June 28, 1927.
N. L. JARVIS ET AL
1,633,638
CASTER
Filed Dec. 22, 1925
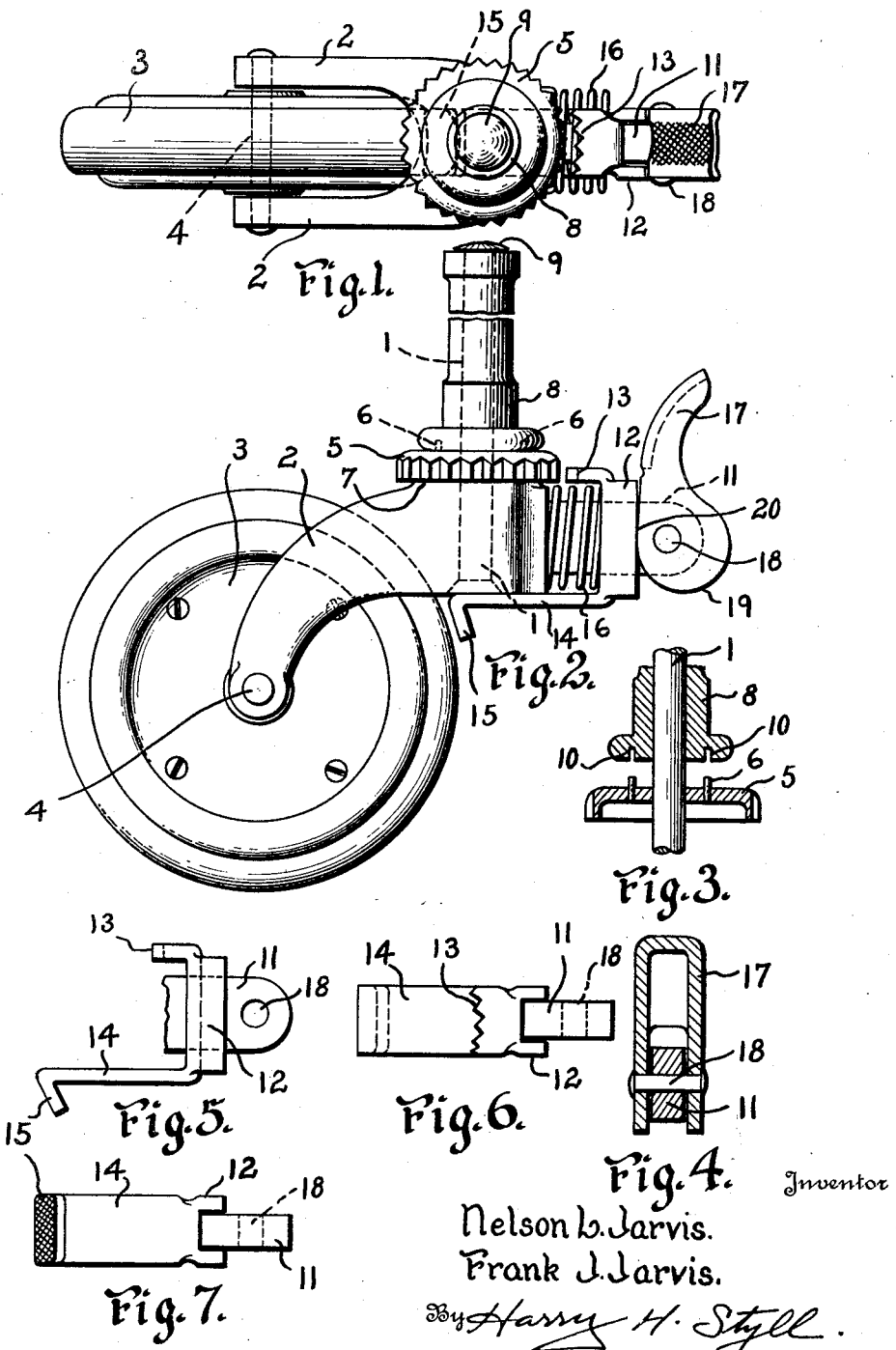
Inventor
Nelson L. Jarvis.
Frank J. Jarvis.
By Harry H. Styll.
Attorney Patented June 28, 1927.

1,633,638

UNITED STATES PATENT OFFICE.

NELSON L. JARVIS AND FRANK J. JARVIS, OF PALMER, MASSACHUSETTS.

CASTER.

Application filed December 22, 1925. Serial No. 76,989.

This invention relates to roller casters, and more particularly to roller casters that may be locked against revolution of the roller or of the caster on its bearing stem or both.

The chief object of the invention is to provide locking or braking means to hold the roller against rotative movement on its pivot and to release the same.

Another object of the invention is to provide locking means to prevent the caster turning on its bearing stem and to release the same.

Another object is to provide means that will simultaneously lock both the roller and the caster on its bearing stem, and means for releasing both simultaneously.

Another object is to provide locking and braking means for the roller and for the caster on its bearing stem that may be operated by the foot.

Another object is to provide resilient means that will tend to hold the locking means normally in unlocked position.

Another object is to provide economic and simple devices for performing these operations.

The invention contemplates these and other objects which will become apparent from the drawings, and the following description. The preferred form only is shown and described by way of illustration, and it is to be understood that changes may be made in the arrangement of parts and the details of construction thereof without departing from the spirit of the invention, as expressed in the claims and as such are a part of the invention.

Referring to the drawings, in which like characters represent like parts throughout:

Figure 1 is a top or plan view.

Figure 2 is a side elevation.

Figure 3 is a partial sectional elevation of the caster stem bearing.

Figure 4 is a sectional elevation of the brake lever through its pivotal connection to the caster.

Figure 5 is a side view of the brake.

Figure 6 is a top view of the brake; and

Figure 7 is a bottom view of the brake.

In practice it has been found that many objects provided with roller casters have a tendency to move away or roll on the casters when they are being worked upon. In some cases this is annoying and interferes with the work being performed on the object. In others, such as hospital beds and operating tables, it is positively dangerous. This invention is designed to avoid this disadvantage by providing means that will lock the roller against rotation when desired, as well as to lock the movement of the caster on its bearing stem. It will be readily apparent that such locking means must be easily and readily operable both as to locking and unlocking, for it is desirable that the object be easily moved on its casters to the position desired, and then locked to insure steadiness and immobility while the work is being performed upon it, and then readily released so it may be moved out of the way as desired.

The device comprises a caster stem or pin 1, secured in the roller support 2, which is bifurcated. The caster roller 3 is pivoted between the bifurcations of the support 2 on the pivot pin 4, on which it is rotatable freely. The pin 4 is headed over to hold the parts together. On the caster stem 1 immediately above the support 2 is a ratchet wheel 5 having projecting pins 6. The ratchet wheel turns freely on the stem 1 and rests on a bearing surface or boss 7 on the support 2. On the stem 1, above the ratchet 5, is the caster sleeve or bearing 8, which also turns freely on the stem 1. The stem 1 is headed down over the top of the sleeve 8 at 9 to keep the parts together. On the bottom of the sleeve 8 are the recesses 10 into which fit the pins 6, whereby the ratchet 5 is locked to the sleeve 8 and turns with it. If desired the sleeve 8 and ratchet 5 could be made integral or otherwise secured together. The sleeve 8 is secured to the object to which the caster is applied. Extending from one side of the support 2 is an extension 11. Slidable on this extension 11 is a brake member 12 having a toothed pawl portion 13 adapted to engage the teeth of the ratchet wheel 5 and a brake portion 14 having a brake shoe 15 adapted to engage the edge of the roller wheel 3. Between the brake member 12 and the body of the support 2 is a spiral spring 16 tending to hold the pawl 13 and the brake 15 away from the socket 5 and roller 3, respectively. On the outer end of the extension 11 is the brake lever arm 17, pivoted to the extension 11 at 18. The brake lever 17 has the cam face 19 and the flat place 20. When the flat place 20 bears against the edge of the brake member 12 the spring 16 forces the pawl 13 and the brake shoe 15 away from the ratchet wheel 5 and wheel 3, respectively. When the lever 17 is pushed down the cam face 19 engages the brake member 12 and forces the pawl 13 and shoe 15 into engagement with the ratchet 5 and wheel 3, respectively, to lock the sleeve 8 against rotation on the stem 1 and to lock the roller against rotation on its pivot 4. To unlock the parts it is only necessary to raise the lever 17 until the flat place 20 comes into contact with the brake member 12. When unlocked the operation of the roller 3 on its pivot 4 is the same as in prior art casters, and the movement of the sleeve 8 on the stem 1 is the same as in such casters, giving the caster a rotative movement on the stem 1, and a rolling movement on the roller wheel 3. When locked neither of these movements can take place. The brake lever 17 may be pushed down by the foot to lock the parts, or pulled up by the toe of the foot to release the same. When the lever is pulled up the spring 16 forces the pawl and brake shoe out of engagement.

From the foregoing it will be seen that simple and efficient means have been provided to insure the objects set forth herein, and that many changes in the details of construction can be made without departing from the invention as claimed, in consequence of which the invention is not to be limited to the specific construction shown.

Having described our invention, we claim:

1. In a device of the character described, a roller support having a roller fork and a slide extension beyond the fork, a roller in the fork, a caster stem carried by the support and extending therebeyond, a lock member on the stem having edge serrations and a slide yoke on the slide extensions of the support having a pair of arms substantially parallel to the slide extensions, one arm being adapted to engage the edge serrations of the lock member.

2. In a device of the character described, a roller support having a roller fork and a slide extension beyond the fork, a roller in the fork, a caster stem carried by the support and extending therebeyond, a lock member on the stem having edge serrations and a slide yoke on the slide extension of the support having a pair of arms substantially parallel to the slide extension, one arm being adapted to engage the edge of the roller and the other arm to engage the edge serrations of the lock member, and means adapted to yieldingly hold the arms out of contact with the edge of the roller and the edge serrations of the lock member.

3. In a device of the character described, a roller support having a roller fork and a slide extension beyond the fork, a roller in the fork, a caster stem carried by the support and extending therebeyond, a lock member on the stem having edge serrations and a slide yoke on the slide extension of the support having a pair of arms substantially parallel to the slide extension, one arm being adapted to engage the edge of the roller and the other arm to engage the edge serrations of the lock member, means adapted to yieldingly hold the arms out of contact with the edge of the roller and the edge serrations of the lock member, and cam means adapted to force the arms into engagement with the edge of the roller and the edge serrations of the lock member against the action of the yielding means.

4. In a device of the character described, a roller support having a roller fork and a slide extension beyond the fork, a roller in the fork, a caster stem on the support extending normal to the slide extension, a caster sleeve on the stem, a lock member on the stem having edge serrations, separable interengaging members between the caster sleeve and lock member locking the two together, and a slide yoke on the slide extension of the support having a pair of arms substantially parallel to the slide extension, one being adapted to engage the edge of the roller and the other to engage the edge serrations of the lock member.

5. In a device of the character described, a roller support having a roller fork and a slide extension beyond the fork, a roller in the fork, a caster stem on the support extending normal to the slide extension, a caster sleeve on the stem, a lock member on the stem having edge serrations, separable interengaging members between the caster sleeve and lock member locking the two together, a slide yoke on the slide extension of the support having a pair of arms substantially parallel to the slide extension, one being adapted to engage the edge of the roller and the other to engage the edge serrations of the lock member, and means adapted to yieldingly hold the arms out of contact with the edge of the roller and the edge serrations of the lock member.

6. In a device of the character described, a roller support having a roller fork and a slide extension beyond the fork, a roller in the fork, a caster stem on the support extending normal to the slide extension, a caster sleeve on the stem, a lock member on the stem having edge serrations, separable interengaging members between the caster sleeve and lock member locking the two together, a slide yoke on the slide extension of the support having a pair of arms substantially parallel to the slide extension, one being adapted to engage the edge of the roller and the other to engage the edge serrations of the lock member, means adapted to yieldingly hold the arms out of contact with the edge of the roller and the edge serrations of the lock member, and cam means adapted to force the arms into engagement with the edge of the roller and the edge serrations of the lock members against the action of the yielding means.

NELSON L. JARVIS.
FRANK J. JARVIS.